US012621742B2

(12) United States Patent
Zhang

(10) Patent No.: US 12,621,742 B2
(45) Date of Patent: May 5, 2026

(54) DATA TRANSMISSION METHOD, RELATED DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 330 days.

(21) Appl. No.: 18/340,516

(22) Filed: Jun. 23, 2023

(65) Prior Publication Data

US 2023/0337109 A1     Oct. 19, 2023

Related U.S. Application Data

(63) Continuation of application No. PCT/CN2022/132318, filed on Nov. 16, 2022.

(30) Foreign Application Priority Data

Jan. 11, 2022    (CN) .......................... 202210028773.5

(51) Int. Cl.
*H04W 40/20*          (2009.01)
(52) U.S. Cl.
CPC .................................... *H04W 40/20* (2013.01)
(58) Field of Classification Search
CPC ...... H04W 40/20; H04W 40/02; H04L 45/00; H04L 45/14

USPC ......................................... 370/310, 328, 329
See application file for complete search history.

(56) References Cited

U.S. PATENT DOCUMENTS

| | | | |
|---|---|---|---|
| 2020/0359295 A1 | 11/2020 | Huang-Fu | |
| 2021/0258868 A1 | 8/2021 | Wong et al. | |
| 2023/0397155 A1* | 12/2023 | Ryu .................... | H04W 12/082 |

FOREIGN PATENT DOCUMENTS

| | | |
|---|---|---|
| CN | 111491346 A | 8/2020 |
| CN | 113412665 A | 9/2021 |
| CN | 113630749 A | 11/2021 |
| CN | 113810973 A | 12/2021 |
| WO | 2021/042398 A1 | 3/2021 |

OTHER PUBLICATIONS

International Search Report for PCT/CN2022/132318 dated Feb. 13, 2023.

* cited by examiner

*Primary Examiner* — Obaidul Huq
(74) *Attorney, Agent, or Firm* — Sughrue Mion, PLLC

(57) ABSTRACT

Provided are a method, apparatus, a non-transitory computer-readable storage medium for data transmission in a 5G communication system. The process may include generating a user equipment (UE) route selection policy (URSP), the URSP comprising a URSP rule, the URSP rule comprising a route selection descriptor (RSD), the RSD comprising height information, and the height information being used for indicating selection of the RSD to transmit application data based on a height of a terminal matching the height information. The process may also include transmitting the URSP to the terminal via a second network element.

16 Claims, 7 Drawing Sheets

100

S710

Transmit height information to a first core network element

S810

Receive a URSP from a second core network element

S820

Select the RSD to transmit application data in a case that the height of the terminal matches the height information Communication device <u>1300</u>

DATA TRANSMISSION METHOD, RELATED DEVICE, COMPUTER-READABLE STORAGE MEDIUM, AND COMPUTER PROGRAM PRODUCT

CROSS-REFERENCE TO RELATED APPLICATIONS

This application claims priority to International Application No. PCT/CN2022/132318, filed with the China National Intellectual Property Administration on Nov. 16, 2022, which claims priority to Chinese Patent Application No. 202210028773.5, filed with the China National Intellectual Property Administration on Jan. 11, 2022, the disclosure of which are incorporated herein in their entireties.

FIELD

The present disclosure relates to the technical field of communications, and in particular, to a data transmission method between a first core network element, a second core network element, a third network element, a terminal, a communication device, a computer-readable storage medium, and a computer program product.

BACKGROUND

Terminal/user equipment (UE) policies include a terminal route selection policy (URSP), but the content of URSP rules in the related art needs to be further extended according to specific service requirements to support specific service demands.

SUMMARY

An embodiment of the present disclosure relates to a method for data transmission method in a 5G communication network. The method may be executed by a first core network element and may include generating a user equipment (UE) route selection policy (URSP), the URSP comprising a URSP rule, the URSP rule comprising a route selection descriptor (RSD), the RSD comprising height information, and the height information indicating a selection of the RSD to transmit application data based on a height of a terminal matching the height information; and transmitting the URSP to the terminal via a second core network element.

An embodiment of the present disclosure relates to an apparatus for data transmission in a 5G communication network. The apparatus may include at least one memory configured to store program code; and at least one processor configured to read the program code and operate as instructed by the program code. The program code may include first generating code configured to cause the at least one first processor to generate a user equipment (UE) route selection policy (URSP), the URSP comprising a URSP rule, the URSP rule comprising a route selection descriptor (RSD), the RSD comprising height information, and the height information indicating a selection of the RSD to transmit application data based on a height of a terminal matching the height information; and first transmitting code configured to cause the at least one first processor to transmit the URSP to the terminal via a second network element.

An embodiment of the present disclosure relates to a non-transitory computer-readable medium storing program code which, when executed by one or more processors of a device for data transmission in a 5G communication net-work, cause the one or more processors to at least generate a user equipment (UE) route selection policy (URSP), the URSP comprising a URSP rule, the URSP rule comprising a route selection descriptor (RSD), the RSD comprising height information, and the height information indicating a selection of the RSD to transmit application data based on a height of a terminal matching the height information; and transmit the URSP to the terminal via a second network element.

DETAILED DESCRIPTION

Figure 1:
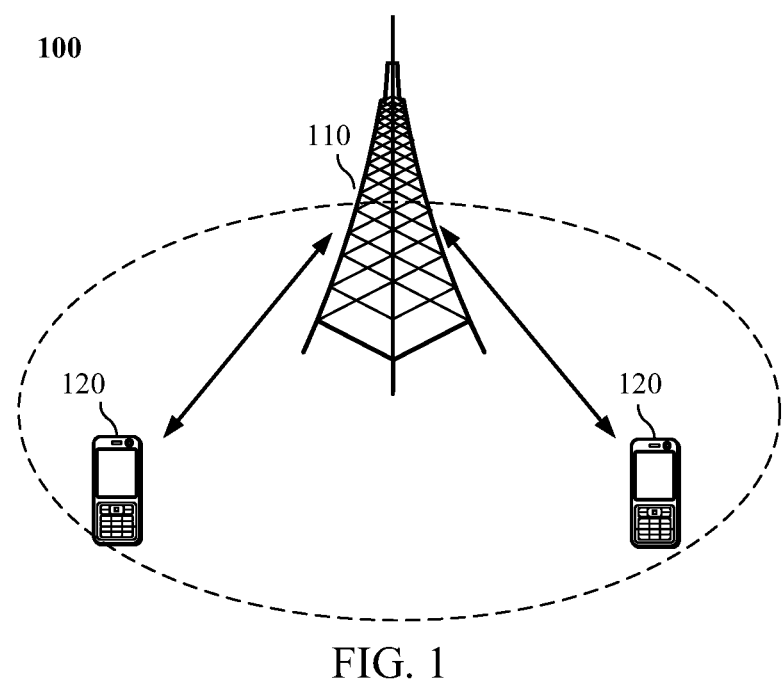
FIG. 1 is a schematic architectural diagram of a communication system according to an embodiment of the present disclosure.

Exemplary implementations will now be described more thoroughly with reference to the accompanying drawings. However, the examples of implementations may be implemented in multiple forms, and it is not to be understood as being limited to the examples described herein. Conversely, the implementations are provided to make the present disclosure more comprehensive and complete, and comprehensively convey the idea of the examples of the embodiments to a person skilled in the art.

An embodiment of the present disclosure provides a data transmission method, a first core network element, a second core network element, a third network element, a terminal, a communication device, a computer-readable storage medium, and a computer program product, which can generate URSP rules that meet application requirements of the terminal in consideration of the height of the terminal during the generation of the URSP rules.

This embodiment of the present disclosure provides a data transmission method. The method is performed by a first core network element. The method includes: generating a URSP, the URSP including a URSP rule, the URSP rule including a route selection descriptor (RSD), the RSD including height information, and the height information being used for indicating selection of the RSD to transmit application data in a case that the height of a terminal matches the height information; and issuing the URSP to the terminal via a second core network element.

This embodiment of the present disclosure provides a data transmission method. The method is performed by a second core network element. The method includes: receiving a URSP sent by a first core network element, the URSP including a URSP rule, the URSP rule including an RSD, the RSD including height information, and the height information being used for indicating selection of the RSD to transmit application data in a case that the height of a terminal matches the height information; and issuing the URSP to the terminal.

This embodiment of the present disclosure provides a data transmission method. The method is performed by a third network element. The method includes: transmitting height information to a first core network element, the height information being used for generating a URSP, the URSP including a URSP rule, the URSP rule including an RSD, the RSD including the height information, and the height information being used for indicating selection of the RSD to transmit application data in a case that the height of a terminal matches the height information.

This embodiment of the present disclosure provides a data transmission method. The method is performed by a terminal. The method includes: receiving a URSP from a second core network element, the URSP including a URSP rule, the URSP rule including an RSD, and the RSD including height information; and selecting the RSD to transmit application data in a case that the height of the terminal matches the height information.

This embodiment of the present disclosure provides a first core network element, including: a generation unit, configured to generate a URSP, the URSP including a URSP rule, the URSP rule including an RSD, the RSD including height information, and the height information being used for indicating selection of the RSD to transmit application data in a case that the height of a terminal matches the height information; and a sending unit, configured to issue the URSP to the terminal via a second core network element.

This embodiment of the present disclosure provides a second core network element, including: a receiving unit, configured to receive a URSP sent by a first core network element, the URSP including a URSP rule, the URSP rule including an RSD, the RSD including height information, and the height information being used for indicating selection of the RSD to transmit application data in a case that the height of a terminal matches the height information; and a sending unit, configured to issue the URSP to the terminal.

This embodiment of the present disclosure provides a third network element, including: a sending unit, configured to transmit height information to a first core network element, the height information being used for generating a URSP, the URSP including a URSP rule, the URSP rule including an RSD, the RSD including the height information, and the height information being used for indicating selection of the RSD to transmit application data in a case that the height of a terminal matches the height information.

This embodiment of the present disclosure provides a terminal, including: a receiving unit, configured to receive a URSP from a second core network element, the URSP including a URSP rule, the URSP rule including an RSD, and the RSD including height information; and a transmission unit, configured to select the RSD to transmit application data in a case that the height of the terminal matches the height information.

This embodiment of the present disclosure provides a computer-readable storage medium, storing computer programs. The programs, when executed by a processor, implement the data transmission method in this embodiment of the present disclosure.

This embodiment of the present disclosure provides a communication device, including: one or more processors; and a memory, configured to store one or more programs, the one or more programs, when executed by the one or more processors, enabling the communication device to implement the data transmission method in this embodiment of the present disclosure.

This embodiment of the present disclosure provides a computer program product, including computer programs. The computer programs, when executed by a processor, implement the data transmission method in this embodiment of the present disclosure.

An embodiment of the present disclose provides a non-transitory computer-readable medium storing instructions. The instructions include one or more instructions that, when executed by one or more processors of a device for data transmission in a 5G communication network, cause the one or more processors to generate a user equipment (UE) route selection policy (URSP), the URSP comprising a URSP rule, the URSP rule comprising a route selection descriptor (RSD), the RSD comprising height information, and the height information being used for indicating selection of the RSD to transmit application data based on a height of a terminal matching the height information; and transmit the URSP to the terminal via a second network element.

An embodiment of the present disclosure provides a method for a 5G communication network. The method may be executed by a first network element and may include generating a user equipment (UE) route selection policy (URSP), the URSP comprising a URSP rule, the URSP rule comprising a route selection descriptor (RSD), the RSD comprising height information, and the height information being used for indicating selection of the RSD to transmit application data based on a height of a terminal matching the height information; and transmitting the URSP to the terminal via a second network element.

An embodiment of the present disclosure provides an apparatus for data transmission in a 5G communication network. The apparatus may include at least one memory configured to store a program code; and at least one processor configured to read the program code and operate as instructed by the program code. The program code may include first generating code configured to cause the at least one first processor to generate a user equipment (UE) route selection policy (URSP), the URSP comprising a URSP rule, the URSP rule comprising a route selection descriptor (RSD), the RSD comprising height information, and the height information being used for indicating selection of the RSD to transmit application data based on a height of a terminal matching the height information; and first transmitting code configured to cause the at least one first processor to transmit the URSP to the terminal via a second network element.

Compared with the related art, various embodiments extend the support of specific service demands related to height information by extending a URSP rule according to specific service requirements, and can support the flexible route selection of a UE with a specific height and the route selection of the UE with the specific height via the interaction between an application and a network The technical solutions in the embodiments of the present disclosure may be applied to various communication systems, for example: a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communication system or 5G system, and the like.

Exemplarily, a communication system 100 to which the embodiments of the present disclosure are applied is as shown in FIG. 1. The communication system 100 may include a network device 110. The network device 110 may be a device that communicates with a terminal 120 (or referred to as a communication terminal or a terminal). The network device 110 may provide communication coverage for a particular geographic region and may communicate with a terminal located within the coverage region. In some embodiments, the network device 110 may be a base transceiver station (BTS) in the GSM or CDMA system, a nodeB (NB) in the WCDMA system, an evolutional node B, eNB or eNodeB in the LTE system, a base station in a 5G communication system, or a wireless controller in a cloud radio access network (CRAN). Or, the network device may be a mobile switching center, a relay station, an access point, a vehicle-mounted device, a wearable device, a hub, a switch, a bridge, a router, a network-side device in a 5G network, or a network device in a future evolved public land mobile network (PLMN).

The communication system 100 may further include at least one terminal 120 located within the coverage range of the network device 110. "Terminal" as used herein includes, but is not limited to, a connection via a wired line, such as via a public switched telephone network (PSTN), a digital subscriber line (DSL), a digital cable, or a direct cable; and/or another data connection/network; and/or via a wireless interface, for example, for a cellular network, a wireless local area network (WLAN), a digital television network such as a DVB-H network, a satellite network, and an AM-FM broadcast transmitter; and/or an apparatus of another terminal configured to receive/send a communication signal; and/or an Internet of things (IoT) device. A terminal configured to communicate through a wireless interface may be referred to as a "wireless communication terminal", "wireless terminal", or a "mobile terminal". Examples of the mobile terminal include, but are not limited to, satellite or cellular telephones; personal communications system (PCS) terminals that may combine cellular radio telephones with data processing, fax, and data communication capabilities; a PDA that may include a radio telephone, a pager, an Internet/Intranet access, a Web browser, a notebook, a calendar, and/or a global positioning system (GPS) receiver; and conventional laptop and/or handheld receivers or other electronic apparatuses including radio telephone transceivers. The terminal may refer to an access terminal, a UE, a subscriber unit, a subscriber station, a mobile radio station, a mobile station, a remote station, a remote terminal, a mobile device, a subscriber terminal, a terminal, a wireless communication device, a subscriber agent, or a user apparatus. The access terminal may be a cellular telephone, a cordless telephone, a session initiation protocol (SIP) telephone, a wireless local loop (WLL) station, a personal digital assistant (PDA), a handheld device having a wireless communication function, a computing device or another processing device connected to a wireless modem, a vehicle-mounted device, a wearable device, a terminal in a 5G network or a terminal in a future evolved PLMN, and the like.

In some embodiments, device to device (D2D) communication may be carried out between the terminals 120.

In some embodiments, the 5G system or the 5G network may also be referred to as a new radio (NR) system or an NR network.

FIG. 1 exemplarily shows one network device and two terminals. In some embodiments, the communication system 100 may include a plurality of network devices and other numbers of terminals may be included within the coverage range of each network device. The embodiments of the present disclosure are not limited thereto.

In some embodiments, the communication system 100 may further include other network entities such as a network policy control entity and a mobility management entity. The embodiments of the present disclosure are not limited thereto.

It is to be understood that a device having a communication function in a network/system in the embodiments of the present disclosure may be referred to as a communication device. Taking the communication system 100 shown in FIG. 1 as an example, the communication device may include a network device 110 and a terminal 120 having a communication function. The network device 110 and the terminal 120 may be specific devices described above and will not be described in detail again. The communication device may further include other devices in the communication system 100, for example, network entities such as a network policy control entity and a mobility management entity. The embodiments of the present disclosure are not limited thereto.

It is to be understood that the terms "system" and "network" are often used interchangeably in this specification. The term "and/or" in this specification only describes an association relationship between associated objects, and represents that three relationships may exist. For example, A and/or B may represent the following three cases: Only A exists, both A and B exist, and only B exists.

Figure 2:
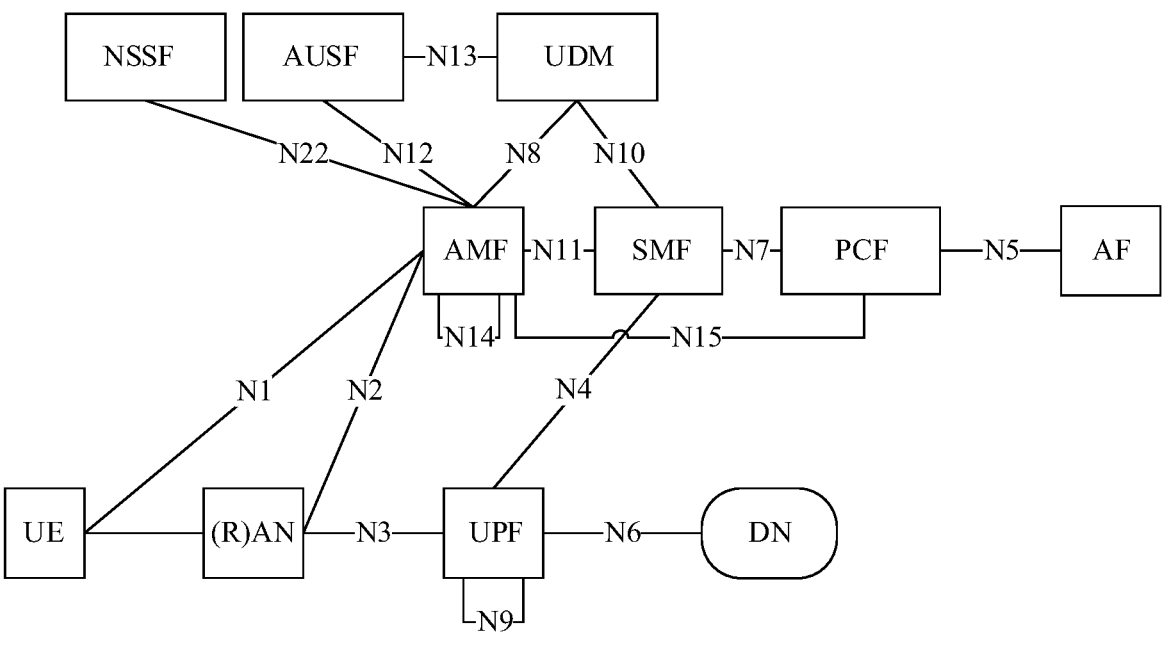
FIG. 2 is a system architectural diagram of a 5G network according to an embodiment of the present disclosure.

FIG. 2 is a system architectural diagram of a 5G network according to an embodiment of the present disclosure. As shown in FIG. 2, the devices involved in the 5G network system include: terminal (UE)>radio access network (RAN), user plane function (UPF)>data network (DN), access and mobility management function (AMF), session management function (SMF), policy control function (PCF)>application function (AF)>authentication server function (AUSF), unified data management (UDM), network slice selection function (NSSF).

As shown in FIG. 2, policy-related network elements are mainly the PCF, the AMF, the SMF, the RAN, and the UE. The SMF is mainly responsible for the implementation of session-related policies. The AMF is mainly responsible for the implementation of policies related to access and UE policies. The issuance and update of policies on two network elements (AMF and SMF) are all controlled by the PCF.

Specific to the UE policy, the PCF and the UE may monitor information related to the UE policy through a container, including the content of the UE policy, a UE policy identity, and the like. In an uplink direction, the UE sends the container to the AMF through a non access stratum (NAS) message, and the AMF continuously transmits the container to the PCF in a way that does not sense the container or modify the container. In a downlink direction, the PCF sends the container to the AMF, and the AMF transmits the container to the UE through the NAS message.

The UE policy includes a URSP. The URSP contains a plurality of policy rules (referred to as URSP rules). Each URSP rule consists of a traffic descriptor and a set of RSDs. The traffic descriptor in the URSP is used for describing a specific service. One traffic descriptor may correspond to one or more RSDs. Each RSD corresponds to the attribute of a protocol data unit (PDU) session. That is to say, service data corresponding to the traffic descriptor may be transmitted in the PDU session corresponding to the RSD.

Related contents of the URSP in the related art are shown in Table 1 and Table 2 below:

TABLE 1

URSP rule

| Information name | Description | Category | PCF permitted to modify in a UE context | Scope |
|---|---|---|---|---|
| Rule precedence | Determines the order the URSP rule is enforced in the UE. | Mandatory | Yes | UE context |
| Traffic descriptor | This part defines the Traffic descriptor components for the URSP rule. | Mandatory | | |
| Application descriptors | It consists of OSId and OSAppId(s). (Note 2) | Optional | Yes | UE context |
| IP descriptors | Destination IP3 tuple(s) (IP address or IPv6 network prefix, port number, protocol ID of the protocol above IP). | Optional | Yes | UE context |
| Domain descriptors | FQDN(s) or a regular expression which are used as domain name matching criteria. | Optional | Yes | UE context |
| Non-IP descriptors | Descriptor(s) for destination information of non-IP traffic. | Optional | Yes | UE context |
| Data network name (DNN) | This is matched against the DNN information provided by the application. | Optional | Yes | UE context |
| Connection capabilities | This is matched against the information provided by a UE application when it requests a network connection with certain capabilities. (Note 4) | Optional | Yes | UE context |
| List of route selection descriptors | A list of route selection descriptors. The components of a route selection descriptor are described in table 6.6.2.1-3. | Mandatory | | |

In Table 1 above, Rule precedence represents rule precedence, which determines the order in which the UE uses URSP rules. Traffic descriptor is a traffic descriptor that describes matching criteria and consists of one or more components, and may include: application descriptors, IP descriptors (destination IP), domain descriptors (fully qualified domain name (FQDN)), non-IP descriptors, DNN descriptors, and connection capabilities. The traffic descriptor is used by the UE for application matching. This URSP rule is applicable when each component in the traffic descriptor matches corresponding information from an application. This URSP rule is not applicable when any of the components in the traffic descriptor is in the following cases: no corresponding information from the application is available; the corresponding information from the application does not match any value in the traffic descriptor components.

TABLE 2

RSD

| Information name | Description | Category | PCF permitted to modify in URSP | Scope |
|---|---|---|---|---|
| Route selection descriptor precedence | Determines the order in which the route selection descriptors are to be applied. | Mandatory | Yes | UE context |
| Route selection components | This part defines the route selection components | Mandatory | | |
| Service and session continuity (SSC) mode selection | One single value of SSC mode. | Optional | Yes | UE context |
| Network slice selection | Either a single value or a list of values of S-NSSAI(s). | Optional | Yes | UE context |
| DNN selection | Either a single value or a list of values of DNN(s). | Optional | Yes | UE context |
| PDU session type selection | One single value of PDU session type. | Optional | Yes | UE context |
| Non-seamless offload indication | Indicates if the traffic of the matching application is to be offloaded to non-3GPP access outside of a PDU Session. | Optional | Yes | UE context |
| ProSe layer-3 UE-to-network relay offload indication | Indicates if the traffic of the matching application is to be sent via a ProSe layer-3 UE-to-network relay outside of a PDU session. | Optional | Yes | UE context |
| Access type preference | Indicates the preferred access type (3GPP or non-3GPP or multi-access) when the UE establishes a PDU session for the matching application. | Optional | Yes | UE context |
| PDU session pair ID | An indication shared by redundant PDU sessions as described in clause 5.33.2.1 of TS 23.501 [2]. | Optional | Yes | UE context |
| Robust security network (RSN) | The RSN as described in clause 5.33.2.1 of TS 23.501 [2]. | Optional | Yes | UE context |

TABLE 2-continued

| | | | PCF permitted to modify in URSP | |
| Information name | Description | Category | | Scope |
| --- | --- | --- | --- | --- |
| Route selection validation criteria | This part defines the route validation criteria components | Optional | | |
| Time window | The time window when the matching traffic is allowed. The RSD is not considered to be valid if the current time is not in the time window. | Optional | Yes | UE context |
| Location criteria | The UE location where the matching traffic is allowed. The RSD rule is not considered to be valid if the UE location does not match the location criteria. | Optional | Yes | UE context |

In Table 2 above, Route selection descriptor precedence indicates RSD precedence, which determines the order in which RSD is used, and when the RSD with higher precedence is unavailable, another RSD is used. Route selection components represent route selection components and describe various network resources that may be used by applications. It consists of one or more components and may include SSC mode selection (used by the UE to associate matching applications with an SSC mode), network slice selection (used by the UE to associate a matching application with single network slice selection assistance information (S-NSSAI)), DNN selection (used by the UE to associate a matching application with DNN), PDU session type selection (used by the UE to associate a matching application with the PDU session type), a non-seamless offload indication, and an access type preference (which indicates a preferred access type (3GPP or non-3GPP or multi-Access) if the UE needs to establish a PDU session for the matching application).

Route selection validation criteria describe the corresponding effective conditions, which include a time window (also referred to as a valid time window) and location criteria (also referred to as location conditions). If the current time is not in the time window or the UE location does not match the location criteria, the corresponding RSD is considered to be invalid.

The SSC mode, the S-NSSAI, the PDU session type, and the DNN are all parameters related to PDU session attributes.

The URSP rules in the related art do not solve the route selection problem of a UE with a particular height and indicate a particular preferred selection problem by an application interacting with a network.

Figure 3:
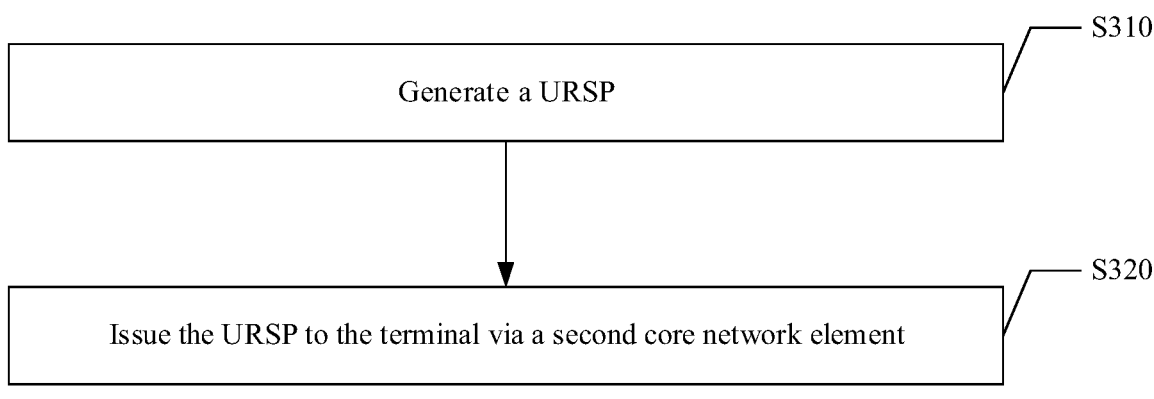
FIG. 3 schematically shows a flowchart of a data transmission method according to an embodiment of the present disclosure.

A data transmission method provided by an embodiment of FIG. 3 may be performed by a first core network element and may also be performed by a core network function. In an exemplary embodiment, the first core network element may be a PCF, but this embodiment of the present disclosure is not limited thereto.

As shown in FIG. 3, the method provided by this embodiment of the present disclosure may include S310 and S320 specifically as follows.

In S310, a URSP is generated.

The URSP may include one or more (two or more) URSP rules. Each URSP rule may include an RSD. One RSD or each RSD may include height information. The height information is used for indicating selection of the corresponding RSD to transmit application data of a terminal in a case that the height of the terminal matches the height information in the RSD.

The URSP is configured to enable a UE to map a specific service flow to a corresponding data transmission session. For example, a PCF may generate a plurality of URSP rules in a core network. Each URSP rule may include a traffic descriptor and an RSD. When an application on the UE is started, the traffic descriptor in the URSP rule generated by the core network may be matched according to traffic characteristics of the application started by the UE to determine the corresponding URSP. Each URSP rule may include one or more RSDs, and corresponding RSD precedence may be configured for different RSDs in each URSP rule according to service requirements and service types. After matching the corresponding URSP, the UE may select the corresponding RSD according to the RSD precedence of each generated RSD, and transmit data of the application (referred to as service data or application data) on the data transmission session corresponding to the RSD.

In this embodiment of the present disclosure, the UE is an unmanned aerial vehicle, but is not limited thereto. The method provided by the present disclosure may be applied to any UE that needs to carry out route selection at a specific height. The specific height is set in the RSD in the URSP rule, and serves as height information in the RSD. The height information may be a value range or a specific value. The value of the height information may be set according to actual requirements. This embodiment of the present disclosure is not limited thereto.

In this embodiment of the present disclosure, when an unmanned aerial vehicle scene is supported, the application may define a specific route path for the flight height access of the unmanned aerial vehicle. For example, it is assumed that the height information in the RSD is set as a height range, for example, 10 m-30 m. When the flight height of the unmanned aerial vehicle is 10 m-30 m, the unmanned aerial vehicle may formally enter a working mode to initiate video transmission. By setting other parameters in the RSD, for example, the unmanned aerial vehicle may access network slice S-NSSAI-1 at this moment, and the SC mode adopts SSC mode 3. In this way, the unmanned aerial vehicle may be controlled not to work when it takes off, and then enter the working mode and initiate video transmission when reaching a certain height. At this specific height, any parameter in the RSD, such as the S-NSSAI, the DNN, and the SSC mode, may be specified and set as any value as required.

The above is illustrated with the height information as the height range, and in some embodiments, the height information may include one or more set height values, for example, 10 m, 20 m, and 30 m.

In an exemplary embodiment, the RSD may include route selection validation criteria. The route selection validation criteria may include location criteria. The location criteria include the height information.

In an exemplary embodiment, the RSD may include route selection validation criteria. The route selection validation criteria may include the height information.

In this embodiment of the present disclosure, in order to support the above scenario, a height-related parameter (height information) is firstly added to the URSP rule, and corresponding parameters may also be supplemented in the process that the AF interacts with the network to affect the URSP rule. For example, the AF directly or indirectly sends height information and/or route selection indication information to the PCF.

In the related URSP rules, route selection validation criteria are defined. The route selection validation criteria include a time window and location criteria.

Time window: The UE executes the RSD defined in the URSP rule only when the conditions of the time window are met (namely, the current time is in the time window). The UE considers the RSD to be invalid if the current time is not in the time window.

Location criteria: UE location information matching the service flow route is defined. When the UE location does not satisfy the location criteria (namely, the UE location is different from the location in the location information), the UE considers the RSD to be invalid.

In the related art, the specific contents of the location criteria are as follows:

length of location criteria (octect d)//standard location length, indicating the length of the location criteria The encoding rules for regions in the location criteria are as follows:

| 8 | 7 | 6 | 5 | 4 | 3 | 2 | 1 | |
|---|---|---|---|---|---|---|---|---|
| 0 | 0 | 0 | 0 | 0 | 0 | 0 | 1 | E-UTRA cell identities list |
| 0 | 0 | 0 | 0 | 0 | 0 | 1 | 0 | NR cell identities list |
| 0 | 0 | 0 | 0 | 0 | 0 | 1 | 1 | Global RAN node identities list |
| 0 | 0 | 0 | 0 | 0 | 1 | 0 | 0 | TAI list |

E-UTRA is the abbreviation of evolved-UMTS terrestrial radio access, namely, evolved universal mobile telecommunications system (UMTS) terrestrial radio access. TAI is the abbreviation of tracking area identity, that is, location area identity or tracking area identity.

This embodiment of the present disclosure proposes to supplement height information in the route selection validation criteria of the URSP rule as criteria for evaluating whether the RSD is valid or not.

In one implementation, the height information may be used as a specific parameter of location criteria, namely, new height information is added as a location area type in the location criteria. That is, the location criteria include height information.

In another implementation, a parameter that is juxtaposed with the time window and the location criteria is added in the route selection validation criteria: height information, namely, path validity conditions include height information.

The above different implementations realize the flexible integration of the height information and the related art.

In this embodiment of the present disclosure, the height information refers to the height information of the UE matching the service flow route. That is, the RSD will be executed only when the UE is at the current height. When the UE is not at the current height, the RSD is not executed.

In an exemplary embodiment, the height information set in the RSD is configured to indicate at least one of the following:

the height information indicates, in response to the route selection validation criteria including a time window and the height information, selection of the RSD to transmit application data in response to a current time being located in the time window in a case that the height of the terminal matches the height information; and the height information indicates, in response to the route selection validation criteria including location information and the height information, selection of the RSD to transmit application data in response to a current location matching the location information in a case that the height of the terminal matches the height information.

As an example, if the height information is a height range, matching of the height of the terminal with the height information may be that the height of the terminal is within a height range. If the height information is one or more height values, matching of the height of the terminal with the height information may be that the height of the terminal is the same as one height value or the height difference therebetween is less than a height difference threshold.

As an example, matching of the current location with the location information may be that the current location is the same as one location in the location information or the distance therebetween is less than a distance threshold.

In this embodiment of the present disclosure, the height information may be separately used as a condition for evaluating whether the RSD is valid, but the height information may be combined with at least one of the time window information and the location information to constitute a condition for evaluating whether the RSD is valid, for example, as follows:

When the route selection validation criteria contain both the time window information and the height information, if the current height of the UE is in the height information and the time is in the time window, the RSD is executed. When the current height of the UE is not in the height information or the current time is not in the time window, namely, one of the two conditions is not satisfied, the RSD is not executed.

When the route selection validation criteria contain both the location condition and the height information, if the current height of the UE is in the height information and the current location of the UE satisfies the location criteria (namely, the current location is UE location information matching the service flow route defined in the location criteria), the RSD is executed. If the current height of the UE does not match the height information or the current location of the UE does not match the location information, namely, one of the two conditions is not satisfied, the RSD is not executed.

When the route selection validation criteria contain the time window information, the height information, and the height information, if the current height of the UE matches the height information, the current time of the UE is in the time window, and the current location of the UE matches the location information, the RSD is executed. When the current time of the UE is not in the time window, or the current height of the UE does not match the height information or the current location of the UE does not match the location information, namely, one of the three conditions is not satisfied, the RSD is not executed.

In an exemplary embodiment, the operation of generating a URSP may include: receiving height information sent by a third network element; and determining to set the height information in the route selection validation criteria with reference to the received height information. In this embodiment of the present disclosure, the third network element may be an AF, but this embodiment of the present disclosure is not limited thereto. After receiving the height information from the AF, the PCF may determine whether to accept the received height information according to the decision thereof. If the height information is accepted, the height information is set in the URSP rule. If the height information is not accepted, the height information is not set in the URSP rule.

In an exemplary embodiment, the operation of receiving height information sent by a third network element may include: receiving service parameters sent by the third network element, where the service parameters may include the height information.

In an exemplary embodiment, the operation of receiving height information sent by a third network element may include: receiving the height information from a fourth core network element. The fourth core network element is configured to receive the height information from the third network element.

The related art defines the flow of AF affecting URSP rules, and parameter information provided by the UE to network elements in the network, such as the NEF (fourth core network element or a fourth core network function), includes:

1) The service description indicates the AF identifier.

2) Service parameters.

3) A specific UE, or a group of UE(s) or any UE that the AF request may be associated with.

4) Subscription to events.

In this embodiment of the present disclosure, the AF may add height information in the service parameters. That is, when the AF requests a network to select a specific route for a UE with a specific height, the AF instructs the PCF to consider the request of the AF when generating URSP rules, and sets the height information carried in the service parameters in specific route selection validation criteria. The AF may send the height information carried in the service parameters to the PCF through the NEF, or send the height information directly to the PCF. After receiving the information sent by the AF, the PCF may determine whether to accept the request of the AF to set URSP rules according to the policy thereof.

The AF may carry the height information in the existing message and the existing parameter and send the height information to the PCF, may add messages and/or parameters, carry the height information in the added parameters in the existing message and send the height information to the PCF, or may carry the height information in the added parameters in the added messages and send the height information to the PCF. The present disclosure is not limited thereto.

In an exemplary embodiment, the RSD may include route selection components. The operation of generating a URSP may include: receiving route selection indication information sent by a third network element; and determining to set a value of a target component in the route selection components with reference to the route selection indication information.

In this embodiment of the present disclosure, the target component may be any one or more of the route selection components of the RSD, such as SSC mode selection and/or network slice selection and/or DNN selection and/or PDU session type selection and/or non-seamless offload indication and/or ProSe layer-3 UE-to-network relay offload indication and/or access type preference and/or PDU session pair ID and/or RSN. The route selection indication information is configured to set values in the target component, such as a particular SSC mode, a particular S-NSSAI or a list of S-NSSAI(s), a particular DNN or a list of DNN(s), a particular PDU session type, a particular access type preference, including one or more of 3rd generation partnership project (3GPP)/non-3GPP/multi-access. The following is illustrated by the SSC mode, the PDU session type, and the access type preference, but this embodiment of the present disclosure is not limited thereto.

In an exemplary embodiment, the operation of receiving route selection indication information sent by a third network element may include: receiving service parameters sent by the third network element, where the service parameters may include the route selection indication information.

In this embodiment of the present disclosure, the PCF may directly receive the service parameters carrying the route selection indication information from the AF, and may also indirectly receive the service parameters carrying the route selection indication information from the AF through the NEF.

In this embodiment of the present disclosure, the route selection indication information may be added in the service parameters, and a parameter may also be added. The added parameter contains the route selection indication information. The present disclosure is not limited thereto.

In an exemplary embodiment, the route selection indication information may include service continuity indication information. The target component may include an SSC mode selection component. The operation of determining to set a value of a target component in the route selection components with reference to the route selection indication information may include: determining to set a value of the SSC mode selection component with reference to the service continuity indication information.

In an exemplary embodiment, the service continuity indication information may include a value of an SSC mode.

In an exemplary embodiment, the service continuity indication information may be used for indicating whether to support a terminal network address change and whether to retain service continuity during the terminal network address change. The operation of determining to set a value of the SSC mode selection component with reference to the service continuity indication information may include: setting, in a case that the service continuity indication information indicates non-support of the terminal network address change, the value of the SSC mode selection component as a first SSC mode; setting, in a case that the service continuity indication information indicates support of the terminal network address change and non-retention of the service continuity, the value of the SSC mode selection component as a second SSC mode; and setting, in a case that the service continuity indication information indicates support of the terminal network address change and retention of the service continuity, the value of the SSC mode selection component as a third SSC mode.

In this embodiment of the present disclosure, the service continuity indication information may be added in the service parameters. That is, when the AF requests the network to select a specific route for a specific service flow, the PCF is instructed to consider the request of the AF when generating the PCF rule. The service continuity indication information is used for setting the SSC mode in the route selection components in the URSP.

In this embodiment of the present disclosure, there are two ways to add the service continuity indication information in the service parameters: In the first way, a specific SSC mode value may be directly indicated. In the second way, it is indicated whether to support the change of UE Internet protocol (IP) address (terminal network address) and whether to retain service continuity when the IP address changes.

"UE IP address change is not supported" corresponds to SSC mode 1 (first service session continuity mode). "UE IP address change is supported but there is no need to retain service continuity" corresponds to SSC mode 2 (second service session continuity mode). "UE IP address change is supported but there is a need to retain service continuity" corresponds to SSC mode 3 (third service session continuity mode).

In an exemplary embodiment, the route selection indication information may include PDU session type indication information. The target component may include a PDU session type selection component. The operation of determining to set a value of a target component in the route selection components with reference to the route selection indication information may include: determining to set a value of the PDU session type selection component with reference to the PDU session type indication information.

In this embodiment of the present disclosure, PDU session type indication information may be added in the service parameters (a specific value may be IPv4, IPv6, or IPv4v6, or Enternet, or unstructured). That is, when the AF requests the network to select a specific route for a specific service flow, the PCF is instructed to consider the request of the AF when generating URSP rules, and uses the PDU session type indication information carried by the service parameters to set PDU session type selection in the route selection components in the URSP.

In an exemplary embodiment, the route selection indication information may include precedence access type indication information. The target component includes an access type preference component. The operation of determining to set a value of a target component in the route selection components with reference to the route selection indication information may include: determining to set a value of the access type preference component with reference to the precedence access type indication information.

In this embodiment of the present disclosure, preference access type indication information (a specific value may be 3GPP access or non-3GPP access or multi-access) may be added in the service parameters. That is, when the AF requests the network to select a specific route for a specific service flow, the PCF is instructed to consider the request of the AF when generating URSP rules, and uses the preference access type indication information carried in the service parameters to set the access type preference of the PDU in the route selection components in the URSP.

This embodiment of the present disclosure provides flexible and diversified implementations for instructing the PCF to consider the request of the AF in generating URSP rules when the AF requests the network to select a specific route for a specific service flow through the setting modes of different indication information.

In S320, the URSP is issued to the terminal via a second core network element or second core network function. In this embodiment of the present disclosure, the second core network element may be an AMF, but this embodiment of the present disclosure is not limited thereto.

For example, the network device 110 in the embodiment of FIG. 1 may be a core network device of the communication system and may generate a plurality of URSP rules. Each URSP rule may include a traffic descriptor and an RSD. One or more applications may be installed on the terminal 120. When an application on the terminal 120 is started, the terminal 120 may match the traffic descriptor in the URSP rule according to traffic characteristics of the started application, and route data of the started application according to the RSD corresponding to the traffic descriptor.

The URSP rule may contain one or more RSDs. Each RSD may be used for indicating a corresponding PDU session. For example, the RSD may contain parameters for PDU session establishment, such as: DNN, network slice selection policy, S-NSSAI, PDU session type, and other parameters. PDU sessions corresponding to different RSDs may provide different Internet experiences.

In this embodiment of the present disclosure, the content of the URSP rules is further extended according to specific service requirements to support specific service demands. For example, for UEs with specific heights such as unmanned aerial vehicles, how to carry out specific route selection and support route selection for UEs with specific heights through interaction between applications and networks. A specific service continuity may also be indicated through interaction between applications and networks. A specific PDU session type may also be selected through interaction between applications and networks.

Figure 4:
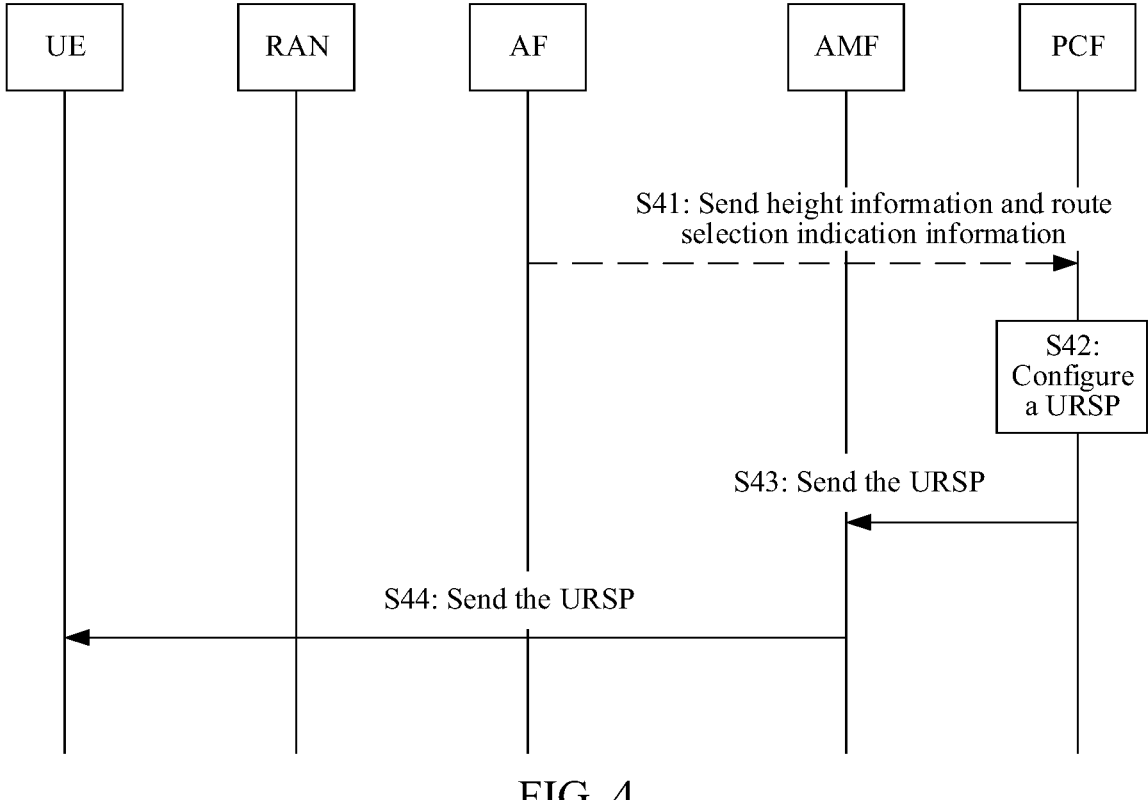
FIG. 4 schematically shows an interaction diagram of a data transmission method according to an embodiment of present disclosure.

Referring to FIG. 4, a first core network element is a PCF, a second core network element is an AMF, a third network element is an AF, and the AF and the PCF interact with each other directly.

FIG. 4 schematically shows an interaction diagram of a data transmission method according to an embodiment of present disclosure. As shown in FIG. 4, the method provided by this embodiment of the present disclosure may include S41 to S44 specifically as follows.

In S41, the AF sends height information and route selection indication information to the PCF.

In S42, the PCF configures a URSP.

After receiving the height information and the route selection indication information from the AF, the PCF determines whether to accept the height information and/or the route selection indication information by referring to the height information and the route selection indication information. If the PCF determines to accept the height information, the height information is included in the RSD of the generated URSP rule. If the PCF does not accept the height information, the height information is not included in the RSD of the generated URSP rule. If the PCF determines to accept the route selection indication information, the PCF determines to set the value of the target component in the route selection components by referring to the route selection indication information. If the PCF determines not to accept the route selection indication information, the PCF determines to set the value of the target component in the route selection components without referring to the route selection indication information.

It is to be understood that the height information and the route selection indication information may be contained in an existing parameter in an existing message, may be contained in an added parameter in the existing message, or may be transmitted by an added message. This embodiment of the present disclosure is not limited thereto.

S41 is that the PCF may directly generate the URSP in some embodiments.

In S43, the PCF sends the URSP.

For example, the PCF may place the generated URSP in a container and send the URSP to the AMF, but this embodiment of the present disclosure is not limited thereto.

In S44, the AMF sends the URSP.

After receiving the URSP, the AMF sends the URSP to a UE through the RAN.

In this embodiment of the present disclosure, the AMF may use an NAS message to forward the container directly to the UE, but this embodiment of the present disclosure is not limited thereto.

The UE associates application data to the corresponding PDU session for transmission based on the received URSP, and the mechanism is as follows: When an application layer sends data, the UE uses the URSP rules in the URSP to check whether the features of the application data match the traffic descriptor of a certain rule in the URSP rules. The checking order is determined according to the precedence in the URSP rules. That is, the UE checks the matching situation in turn based on the preference order. When the traffic descriptor of a URSP rule is matched, a PDU session is bound with an RSD list under the URSP rule. When there is a URSP rule matched, the UE searches for an appropriate PDU session according to the precedence order in the RSD, where the RSD with high preference is preferentially used. If a certain parameter in the RSD is one or more values, the UE selects the combination of parameters to search whether the PDU session exists:

1) if yes, the application data is bound to the session for transmission;

2) if no, the UE triggers the establishment of the PDU session, and establishes attribute parameters of the PDU session reported by the UE in the request message. Further, 2.1) if the session is established successfully, the UE binds the application data to the session for transmission;

2.2) if the session is established unsuccessfully, the UE searches for whether the PDU session exists based on other parameter combinations in the RSD or using the parameter combinations in the RSD with secondary precedence (step 1 is cyclically performed)).

If a suitable PDU session cannot be found for binding according to the matched URSP rules, the UE searches whether the traffic descriptor in the URSP rules with secondary precedence can match the application data flow features according to the precedence order, and when the matching is successful, the process described before is repeated.

This embodiment of the present disclosure enables the network to consider the input information of the application (including height information and/or route selection indication information) when generating the URSP rules through the interaction mode of the applications and the networks, whereby the URSP rules meeting application requirements can be generated.

Other contents of the embodiment of FIG. 4 may be similar to those of the foregoing embodiments.

Figure 5:
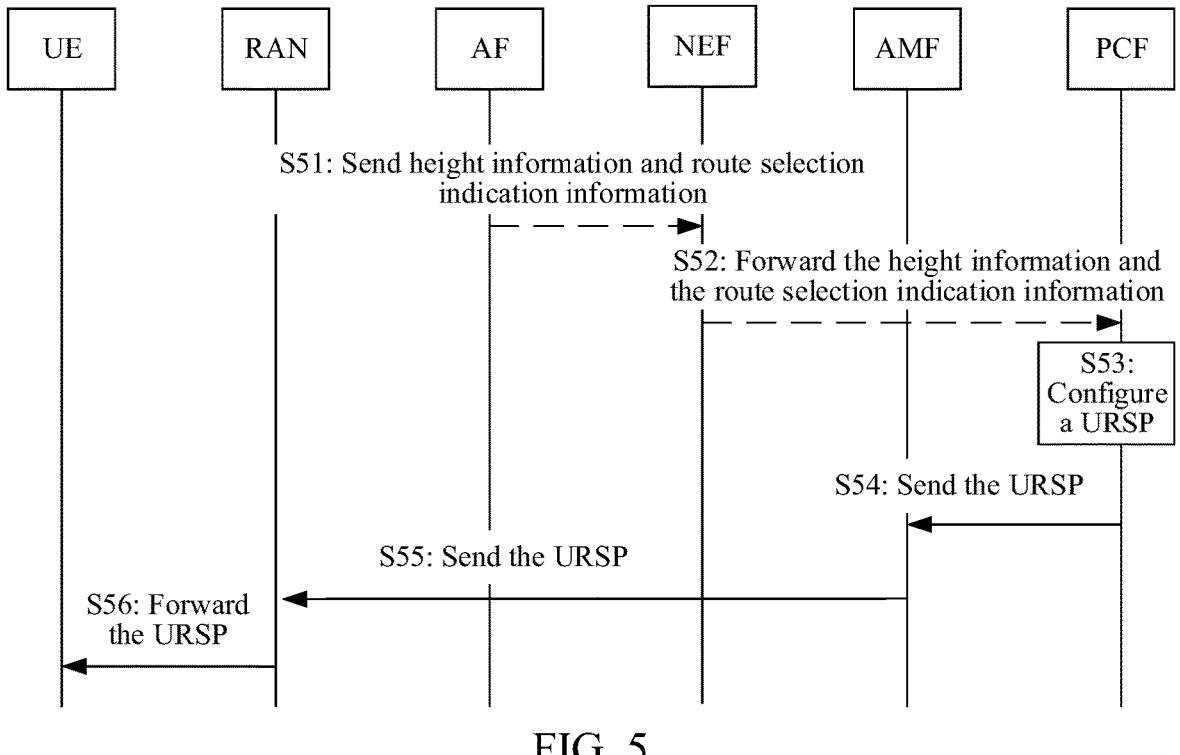
FIG. 5 schematically shows an interaction diagram of a data transmission method according to another embodiment of present disclosure.

In an embodiment of FIG. 5, a first core network element is a PCF, a second core network element is an AMF, a third network element is an AF, a fourth core network element is an NEF, and the AF and the PCF interact with each other through the NEF.

FIG. 5 schematically shows an interaction diagram of a data transmission method according to another embodiment of present disclosure. As shown in FIG. 5, the method provided by this embodiment of the present disclosure may include S51 to S55 specifically as follows.

In S51, the AF sends height information and route selection indication information to the NEF.

In S52, after receiving the height information and the route selection indication information from the AF, the NEF forwards the height information and the route selection indication information to the PCF.

In S53, the PCF configures a URSP.

After receiving the height information and the route selection indication information from the NEF, the PCF generates the URSP by determining whether to accept the received height information and route selection indication information.

S51 and S52 may be performed by default. That is, the PCF may directly generate the URSP.

In S54, the PCF sends the URSP to the AMF.

In S55, the AMF sends the URSP to the RAN.

In S56, after receiving the URSP, the RAN forwards the URSP to a UE.

Other contents of the embodiment of FIG. 5 may be similar to those of the foregoing embodiments.

Figure 6:
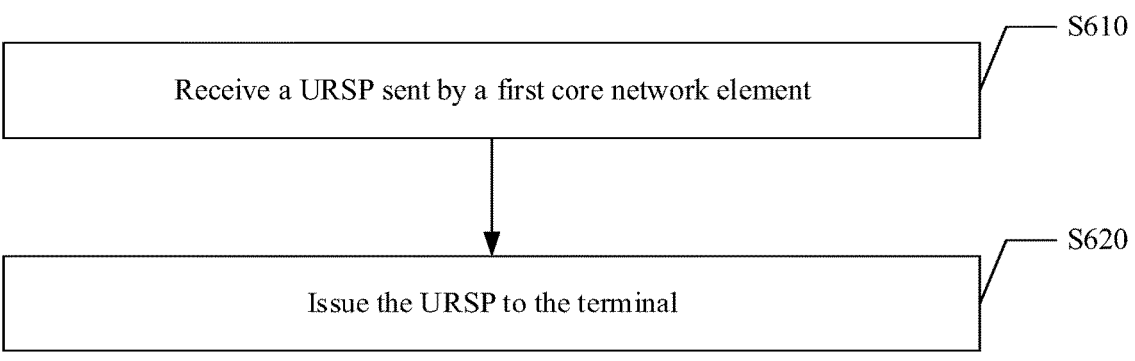
FIG. 6 schematically shows a flowchart of a data transmission method according to another embodiment of the present disclosure.

A data transmission method provided by an embodiment of FIG. 6 may be performed by a second core network element or second core network function. In an exemplary embodiment, the second core network element may be an AMF.

As shown in FIG. 6, the method provided by this embodiment of the present disclosure may include S610 and S620.

In S610, a URSP sent by a first core network element is received.

The URSP includes a URSP rule. The URSP rule includes an RSD. The RSD includes height information. The height information is used for indicating selection of the RSD to transmit application data in a case that the height of a terminal matches the height information.

In S620, the URSP is issued to the terminal.

Other contents of the embodiment of FIG. 6 may be similar to those of the foregoing embodiments.

Figure 7:
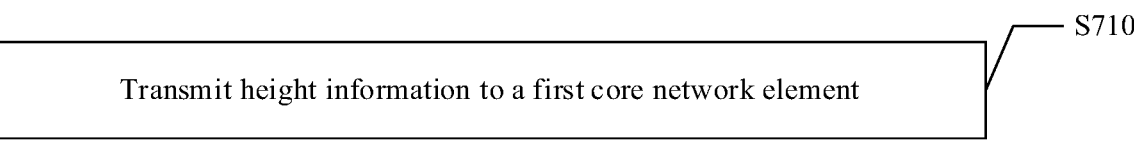
FIG. 7 schematically shows a flowchart of a data transmission method according to yet another embodiment of the present disclosure.

A data transmission method provided by an embodiment of FIG. 7 may be performed by a third network element. In an exemplary embodiment, the third network element may be an AF.

As shown in FIG. 7, the method provided by this embodiment of the present disclosure may include the following operations.

In S710, height information is transmitted to a first core network element.

The height information may be used for generating a URSP. For example, the first core network element is configured to generate a URSP for the terminal according to the height information. The URSP includes a URSP rule. The URSP rule includes an RSD. The RSD includes the height information. The height information may be used for indicating selection of the RSD to transmit application data in a case that the height of a terminal matches the height information.

In an exemplary embodiment, the RSD may further include route selection components. The method may further include: transmitting route selection indication information to a first core network element. The first core network element is further configured to determine to set a value of a target component in the route selection components with reference to the route selection indication information.

Other contents of the embodiment of FIG. 7 may be similar to those of the foregoing embodiments.

Figure 8:
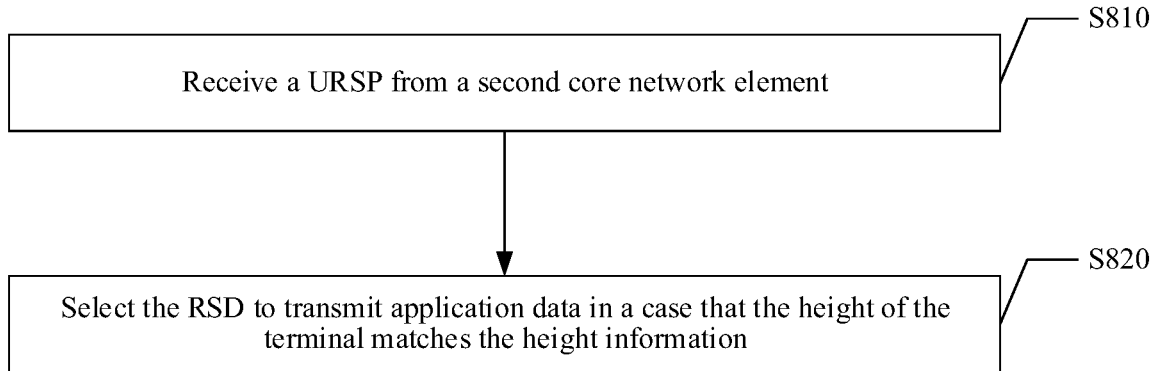
FIG. 8 schematically shows a flowchart of a data transmission method according to yet another embodiment of the present disclosure.

A data transmission method provided by an embodiment of FIG. 8 may be performed by a terminal. But this embodiment of the present disclosure is not limited thereto.

As shown in FIG. 8, the method provided by this embodiment of the present disclosure may include S810 and S820.

In S810, a URSP is received from a second core network element.

The URSP includes a URSP rule. The URSP rule includes an RSD. The RSD includes height information.

In S820, the RSD is selected to transmit application data in a case that the height of the terminal matches the height information.

Other contents of the embodiment of FIG. 8 may be similar to those of the foregoing embodiments.

Figure 9:
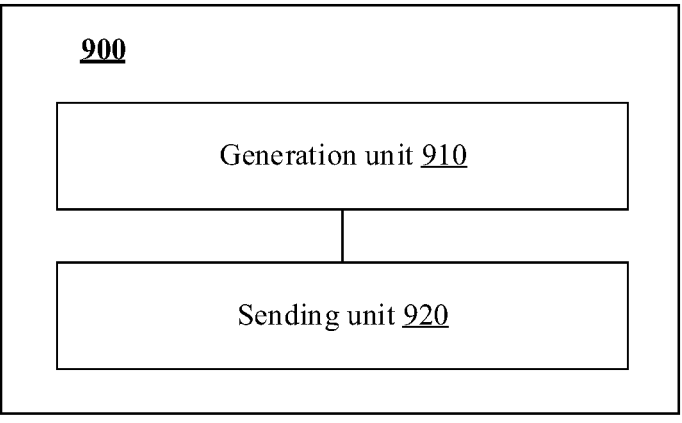
FIG. 9 schematically shows a block diagram of a first core network element according to an embodiment of the present disclosure.

As shown in FIG. 9, a first core network element 900 provided by the embodiment of FIG. 9 may include a generation unit 910 and a sending unit 920.

The generation unit 910 is configured to generate a URSP. The URSP includes a URSP rule. The URSP rule includes an RSD. The RSD includes height information. The height information is used for indicating selection of the RSD to transmit application data in a case that the height of a terminal matches the height information.

The sending unit 920 is configured to issue the URSP to the terminal via a second core network element.

In an exemplary embodiment, the RSD may include route selection validation criteria. The route selection validation criteria include location criteria. The location criteria may include the height information.

In an exemplary embodiment, the RSD includes route selection validation criteria. The route selection validation criteria include the height information.

In an exemplary embodiment, the height information may be used for indicating at least one of the following:

The height information may indicate, in response to the route selection validation criteria including a time window and the height information, selection of the RSD to transmit application data in response to a current time being located in the time window in a case that the height of the terminal matches the height information.

The height information may indicate, in response to the route selection validation criteria including location criteria and the height information, selection of the RSD to transmit application data in response to a current location matching the location information in a case that the height of the terminal matches the height information.

In an exemplary embodiment, the first core network element 900 may further include a receiving unit, configured to receive height information sent by a third network element. The generation unit 910 is further configured to determine to set the height information in the route selection validation criteria with reference to the received height information.

In an exemplary embodiment, the receiving unit is further configured to: receive service parameters sent by the third network element, the service parameters including the height information.

In an exemplary embodiment, the receiving unit is further configured to: receive the height information from a fourth core network element. The fourth core network element is configured to receive the height information from the third network element.

In an exemplary embodiment, the RSD may include route selection components. The first core network element 900 may further include a receiving unit, configured to receive route selection indication information sent by the third network element. The generation unit 910 is further configured to determine to set a value of a target component in the route selection components with reference to the route selection indication information.

In an exemplary embodiment, the receiving unit is further configured to: receive service parameters sent by the third network element, where the service parameters may include the route selection indication information.

In an exemplary embodiment, the route selection indication information may include service continuity indication information. The target component may include an SSC mode selection component. The generation unit 910 is further configured to: determine to set a value of the SSC mode selection component with reference to the service continuity indication information.

In an exemplary embodiment, the service continuity indication information may include a value of an SSC mode.

In an exemplary embodiment, the service continuity indication information may be used for indicating whether to support a terminal network address change and whether to retain service continuity during the terminal network address change. The generation unit 910 is further configured to: set, in a case that the service continuity indication information indicates non-support of the terminal network address change, the value of the SSC mode selection component as a first SSC mode; set, in a case that the service continuity indication information indicates support of the terminal network address change and non-retention of the service continuity, the value of the SSC mode selection component as a second SSC mode; and set, in a case that the service continuity indication information indicates support of the terminal network address change and retention of the service continuity, the value of the SSC mode selection component as a third SSC mode.

In an exemplary embodiment, the route selection indication information may include PDU session type indication information. The target component may include a PDU session type selection component. The generation unit 910 is further configured to: determine to set a value of the PDU session type selection component with reference to the PDU session type indication information.

In an exemplary embodiment, the route selection indication information may include precedence access type indication information. The target component may include an access type preference component. The generation unit 910 is further configured to: determine to set a value of the access type preference component with reference to the precedence access type indication information.

Other contents of the embodiment of FIG. 9 may be similar to those of the foregoing embodiments.

Figure 10:
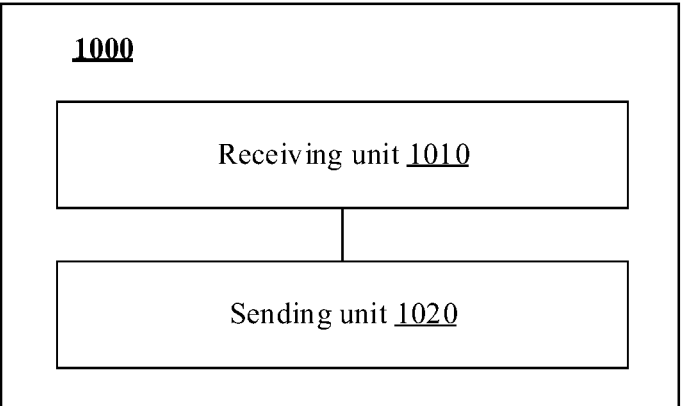
FIG. 10 schematically shows a block diagram of a second core network element according to an embodiment of the present disclosure.

As shown in FIG. 10, a second core network element 1000 provided by the embodiment of FIG. 10 may include a receiving unit 1010 and a sending unit 1020.

The receiving unit 1010 is configured to receive a URSP sent by a first core network element. The URSP includes a URSP rule. The URSP rule includes an RSD. The RSD includes height information. The height information is used for indicating selection of the RSD to transmit application data in a case that the height of a terminal matches the height information.

The sending unit 1020 is configured to issue the URSP to the terminal.

Other contents of the embodiment of FIG. 10 may be similar to those of the foregoing embodiments.

Figure 11:
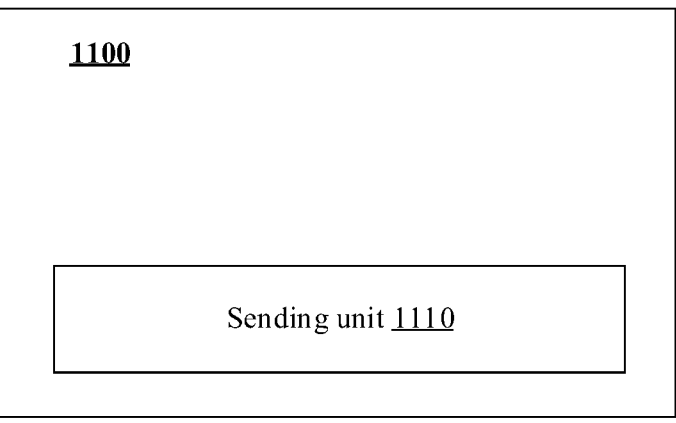
FIG. 11 schematically shows a block diagram of a third network element according to an embodiment of the present disclosure.

As shown in FIG. 11, a third network element 1100 provided by the embodiment of FIG. 11 may include a sending unit 1110.

The sending unit 1110 is configured to transmit height information to a first core network element.

The height information may be used for generating a URSP. The URSP may include a URSP rule. The URSP rule may include an RSD. The RSD may include the height information. The height information may be used for indicating selection of the RSD to transmit application data in a case that the height of a terminal matches the height information.

In an exemplary embodiment, the RSD may further include route selection components.

The sending unit 1110 is further configured to transmit route selection indication information to a first core network element. The first core network element is further configured to determine to set a value of a target component in the route selection components with reference to the route selection indication information.

Other contents of the embodiment of FIG. 11 may be similar to those of the foregoing embodiments.

Figure 12:
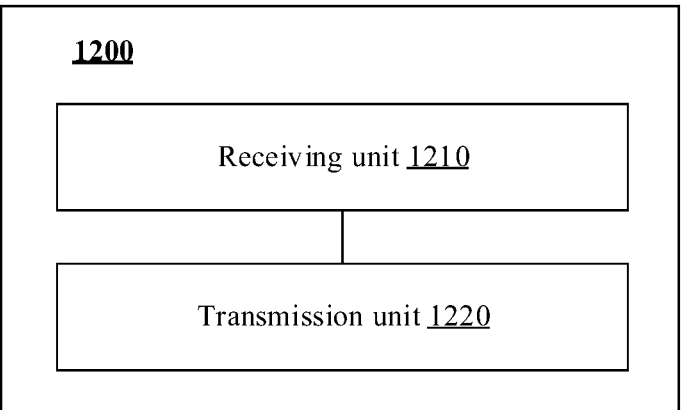
FIG. 12 schematically shows a block diagram of a terminal according to an embodiment of the present disclosure.

As shown in FIG. 12, a terminal 1200 provided by the embodiment of FIG. 12 may include a receiving unit 1210 and a transmission unit 1220.

The receiving unit 1210 is configured to receive a URSP from a second core network element. The URSP includes a URSP rule. The URSP rule includes an RSD. The RSD includes height information.

The transmission unit 1220 is configured to select the RSD to transmit application data in a case that the height of the terminal matches the height information.

Other contents of the embodiment of FIG. 12 may be similar to those of the foregoing embodiments.

The units shown in FIG. 9 to FIG. 12 may be implemented in software, for example, a program and a module. The units may be implemented in hardware, for example, may be implemented by using one or more application specific integrated circuits (ASIC), a digital signal processor (DSP), a programmable logic device (PLD), a complex programmable logic device (CPLD), a field-programmable gate array (FPGA), or other electronic elements.

The first core network element 900, the second core network element 1000, and the third network element 1100 may be implemented by a communication device. An exemplary structure of the communication device is illustrated below.

Figure 13:
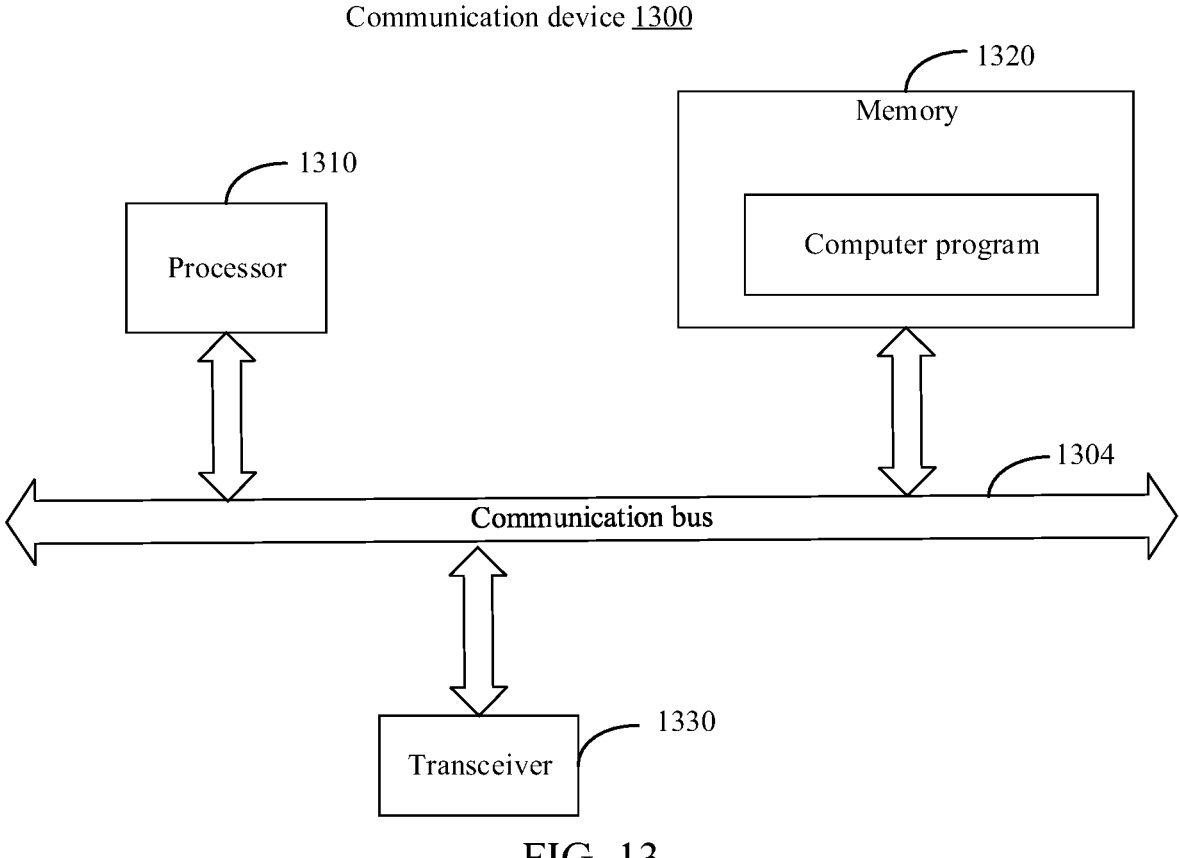
FIG. 13 schematically shows a structural diagram of a communication device according to an embodiment of present disclosure.

FIG. 13 schematically shows a structural diagram of a communication device 1300 according to an embodiment of present disclosure. The communication device may be a terminal or a core network device, for example, a first core network element and/or a second core network element and/or a third network element and/or a fourth core network element. The communication device 1300 shown in FIG. 13 includes a processor 1310. The processor 1310 may invoke and run computer programs from a memory, to implement the method in this embodiment of the present disclosure.

In some embodiments, as shown in FIG. 13, the communication device 1300 may further include a memory 1320. The processor 1310 may invoke and run the computer programs from the memory 1320, to implement the method in this embodiment of the present disclosure.

The memory 1320 may be an individual device independent of the processor 1310, or may be integrated in the processor 1310.

In some embodiments, as shown in FIG. 13, the communication device 1300 may further include a transceiver 1330. The processor 1310 may control the transceiver 1330 to communicate with other devices. Specifically, information or data may be sent to the other devices, or information or data sent by the other devices may be received.

The transceiver 1330 may include a transmitter and a receiver. The transceiver 1330 may further include one or more antennas.

In some embodiments, the communication device 1300 may specifically be a core network device according to this embodiment of the present disclosure, and the communication device 1300 may implement a corresponding flow implemented by the core network device in the method according to this embodiment of the present disclosure. For the sake of brevity, detailed descriptions will be omitted herein.

In some embodiments, the communication device 1300 may specifically be a mobile terminal/UE according to this embodiment of the present disclosure, and the communication device 1300 may implement corresponding flows implemented by the mobile terminal/UE in the methods according to this embodiment of the present disclosure. In order to save space, detailed descriptions will be omitted herein.

It is to be understood that the processor according to this embodiment of the present disclosure may be an integrated circuit chip, and has a signal processing capability. In an implementation process, operations of the foregoing method embodiment may be implemented by using a hardware integrated logic circuit in the processor or instructions in the form of software.

The foregoing processor may be a general purpose processor, a DSP, an ASIC, an FPGA, or another programmable logical device, discrete gate or transistor logical device, or discrete hardware component. The methods, the operations, and logic block diagrams that are disclosed in this embodiment of the present disclosure may be implemented or performed. The general purpose processor may be a microprocessor, or the processor may be any conventional processor or the like. The operations of the methods disclosed with reference to this embodiment of the present disclosure may be directly performed and completed by using a hardware decoding processor, or may be performed and completed by using a combination of hardware and software modules in the decoding processor. The software module may be stored in a storage medium that is mature in the art, such as a random access memory (RAM), a flash memory, a read-only memory (ROM), a programmable read-only memory (PROM), an electrically erasable programmable memory, or a register. The storage medium is located in the memory. The processor reads information in the memory and completes the operations of the methods in combination with hardware thereof.

It is to be understood that, the memory in this embodiment of the present disclosure may be a volatile memory or a non-volatile memory, or may include both a volatile memory and a non-volatile memory. The non-volatile memory may be a ROM, a PROM, an erasable PROM (EPROM), an electrically EPROM (EEPROM), or a flash memory. The volatile memory may be a RAM serving as an external cache. Through illustrative but not limited description, RAMs in many forms, for example, a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), and a direct rambus RAM (DRRAM), are available. The memory in the system and method described in this specification includes, but is not limited to these memories and any other suitable types. It is to be understood that the foregoing memory is exemplary but not limiting.

This embodiment of the present disclosure further provides a computer-readable storage medium for storing computer programs.

In some embodiments, the computer-readable storage medium may be applied to a core network device in this embodiment of the present disclosure, and the computer programs enable a computer to execute corresponding flows implemented by the core network device in the methods according to this embodiment of the present disclosure. For the sake of brevity, detailed descriptions will be omitted herein.

In some embodiments, the computer-readable storage medium may be applied to a mobile terminal/UE in this embodiment of the present disclosure, and the computer programs enable a computer to execute corresponding flows implemented by the mobile terminal/UE in the methods according to this embodiment of the present disclosure. Detailed descriptions will be omitted herein.

This embodiment of the present disclosure further provides a computer program product, including computer program instructions.

In some embodiments, the computer program product may be applied to a core network device in this embodiment of the present disclosure, and the computer program instructions enable a computer to execute corresponding flows implemented by the core network device in the methods according to this embodiment of the present disclosure. For the sake of brevity, detailed descriptions will be omitted herein.

In some embodiments, the computer program product may be applied to a mobile terminal/UE in this embodiment of the present disclosure, and the computer program instructions enable a computer to execute corresponding flows implemented by the mobile terminal/UE in the methods according to this embodiment of the present disclosure. For the sake of brevity, detailed descriptions will be omitted herein.

This embodiment of the present disclosure further provides a computer program.

In some embodiments, the computer program may be applied to a core network device in this embodiment of the present disclosure. When the computer program is run on a computer, the computer executes corresponding flows implemented by the core network device in the methods according to this embodiment of the present disclosure. For the sake of brevity, detailed descriptions will be omitted herein.

In some embodiments, the computer program may be applied to a mobile terminal/UE in this embodiment of the present disclosure. When the computer program is run on a computer, the computer executes corresponding flows implemented by the mobile terminal/UE in the methods according to this embodiment of the present disclosure. For the sake of brevity, detailed descriptions will be omitted herein.

A person of ordinary skill in the art may notice that the exemplary units and algorithm operations described with reference to the embodiments disclosed in this specification can be implemented in electronic hardware, or a combination of computer software and electronic hardware. Whether the functions are executed in the manner of hardware or software depends on particular applications and design constraint conditions of the technical solutions. A person skilled in the art may use different methods to implement the described functions for each particular application, but it is not to be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided by the present disclosure, it is to be understood that the disclosed system, apparatus, and method may be implemented in other manners. For example, the apparatus embodiments described above are merely examples. For example, division into the units is merely logical function division, and may be another division in an actual implementation. For example, a plurality of units or assemblies may be combined or may be integrated into another system, or some features may be ignored or not be performed.

The units described as separate components may or may not be physically separated, and components displayed as units may or may not be physical units, may be located in one place, or may be distributed over a plurality of network units. Some or all of the units may be selected based on actual requirements to achieve the objects of the solutions of this embodiment.

In addition, functional units in the embodiments of the present disclosure may be integrated into one processing unit, or each of the units may exist alone physically, or two or more units may be integrated into one unit.

If implemented in the form of software functional units and sold or used as an independent product, the functions may also be stored in a computer-readable storage medium. Based on this understanding, the technical solution of the present disclosure, either inherently or in any part contributing to the related art, or part of the technical solution, may be embodied in the form of a software product. The computer software product is stored in a storage medium, and includes several instructions for enabling a computer device (which may be a personal computer, a server, or a network device) to perform all or part of the operations of the method according to the embodiments of the present disclosure. The foregoing storage medium includes any medium capable of storing program codes, such as a USB flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for a 5G communication network, performed by a first core network element, the data transmission method comprising:
generating a user equipment (UE) route selection policy (URSP), the URSP comprising a URSP rule, the URSP rule comprising a route selection descriptor (RSD), the RSD comprising route selection validation criteria indicating a selection of the RSD to transmit application data based on height information and one of: a time window and location information,
wherein based on the route selection validation criteria comprising the time window, the RSD to transmit the application data is selected when a current time is within the time window, and
wherein based on the route selection validation criteria comprising the location information, the RSD to transmit the application data is selected when a current location matches the location information; and transmitting the URSP to a terminal via a second core network element.

2. The method according to claim 1, wherein the RSD to transmit the application data is selected based on a height of the terminal matching the height information.

3. The method according to claim 1, wherein the RSD comprises route selection components, and wherein generating the URSP comprises:
receiving route selection indication information from a third core network element; and
determining a value of a target component in the route selection components corresponding to the route selection indication information.

4. The method according to claim 3, wherein the route selection indication information comprises service continuity indication information, wherein the target component comprises a service and session continuity (SSC) mode selection component, and wherein determining the value of the target component comprises:
determining a value of the SSC mode selection component corresponding to the service continuity indication information.

5. The method according to claim 4, wherein the service continuity indication information indicates whether to support a terminal network address change and whether to retain service continuity during the terminal network address change, and wherein determining the value of the SSC mode selection component corresponding to the service continuity indication information comprises:
based on the service continuity indication information indicating non-support of the terminal network address change, determining the value of the SSC mode selection component as a first SSC mode;
based on the service continuity indication information indicating support of the terminal network address change and non-retention of the service continuity, determining the value of the SSC mode selection component as a second SSC mode; and
based on the service continuity indication information indicating support of the terminal network address change and retention of the service continuity, determining the value of the SSC mode selection component as a third SSC mode.

6. The method according to claim 3, wherein the route selection indication information comprises protocol data unit (PDU) session type indication information, wherein the target component comprises a PDU session type selection component, and wherein the determining the value of the target component in the route selection components comprises:
determining a value of the PDU session type selection component corresponding to the PDU session type indication information.

7. The method according to claim 3, wherein the route selection indication information comprises precedence access type indication information, wherein the target component comprises an access type preference component, and wherein the determining the value of the target component in the route selection components with reference to the route selection indication information comprises:
determining a value of the access type preference component corresponding to the precedence access type indication information.

8. An apparatus for data transmission in a 5G communication network, the apparatus comprising:
at least one memory configured to store program code; and
at least one first processor configured to read the program code and operate as instructed by the program code, the program code comprising:
first generating code configured to cause the at least one first processor to generate a user equipment (UE) route selection policy (URSP), the URSP comprising a URSP rule, the URSP rule comprising a route selection descriptor (RSD), the RSD comprising route selection validation criteria indicating a selection of the RSD to transmit application data based on height information and one of: a time window and location information,
wherein based on the route selection validation criteria comprising the time window, the RSD to transmit the application data is selected when a current time is within the time window, and
wherein based on the route selection validation criteria comprising the location information, the RSD to transmit the application data is selected when a current location matches the location information; and
first transmitting code configured to cause the at least one first processor to transmit the URSP to a terminal via a second network element.

9. The apparatus of claim 8, wherein the RSD to transmit the application data is selected based on a height of the terminal matching the height information.

10. The apparatus of claim 8, the RSD comprises route selection components, and wherein the first generating code comprises:
first receiving code configured to cause the at least one first processor to receive route selection indication information from a third core network element; and
first determining code configured to cause the at least one first processor to determine a value of a target component in the route selection components corresponding to the route selection indication information.

11. The apparatus of claim 10, wherein the route selection indication information comprises service continuity indication information, wherein the target component comprises a service and session continuity (SSC) mode selection component, and wherein the first determining code comprises:
second determining code configured to cause the at least one first processor to determine a value of the SSC mode selection component corresponding to the service continuity indication information.

12. The apparatus of claim 11, wherein the service continuity indication information indicates whether to support a terminal network address change and whether to retain service continuity during the terminal network address change, and wherein the second determining code comprises:
based on the service continuity indication information indicating non-support of the terminal network address change, third determining code configured to cause the at least one first processor to determine the value of the SSC mode selection component as a first SSC mode;
based on the service continuity indication information indicating support of the terminal network address change and non-retention of the service continuity, fourth determining code configured to cause the at least one first processor to determine the value of the SSC mode selection component as a second SSC mode; and based on the service continuity indication information indicating support of the terminal network address change and retention of the service continuity, fifth determining code configured to cause the at least one first processor to determine the value of the SSC mode selection component as a third SSC mode.

13. The apparatus of claim 10, wherein the route selection indication information comprises protocol data unit (PDU) session type indication information, wherein the target component comprises a PDU session type selection component, and wherein the first determining code comprises:

sixth determining code configured to cause the at least one first processor to determine a value of the PDU session type selection component corresponding to the PDU session type indication information.

14. The apparatus of claim 10, wherein the route selection indication information comprises precedence access type indication information, wherein the target component comprises an access type preference component, and wherein the first determining code comprises:

seventh determining code configured to cause the at least one first processor to determine a value of the access type preference component corresponding to the precedence access type indication information.

15. A non-transitory computer-readable medium storing program code which, when executed by one or more processors of a device for data transmission in a 5G communication network, cause the one or more processors to at least:

generate a user equipment (UE) route selection policy (URSP), the URSP comprising a URSP rule, the URSP rule comprising a route selection descriptor (RSD), the RSD comprising route selection validation criteria indicating a selection of the RSD to transmit application data based on height information and one of: a time window and location information, wherein based on the route selection validation criteria comprising the time window, the RSD to transmit the application data is selected when a current time is within the time window, and wherein based on the route selection validation criteria comprising the location information, the RSD to transmit the application data is selected when a current location matches the location information; and transmit the URSP to a terminal via a second network element.

16. The non-transitory computer-readable medium of claim 15, wherein the RSD to transmit the application data is selected based on a height of the terminal matching the height information.

* * * * *